O. HOOD & W. A. CLARK.
HORSESHOE.
No. 246,677. Patented Sept. 6, 1881.
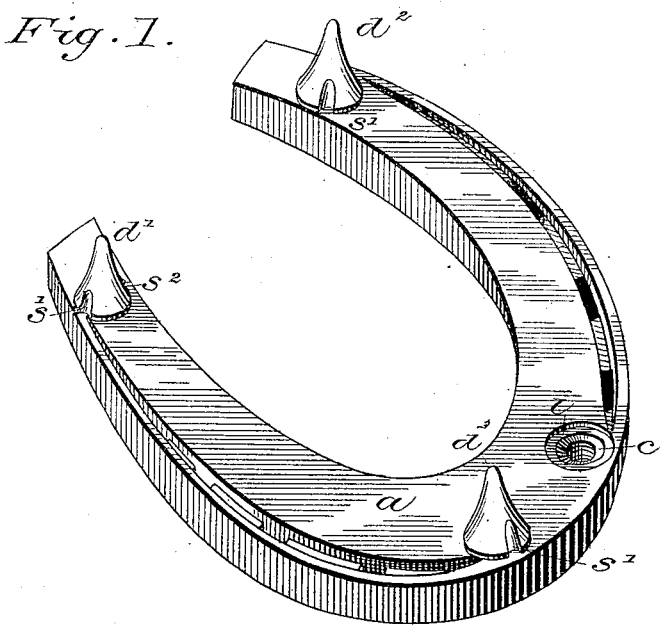
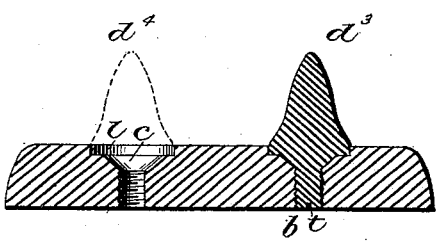
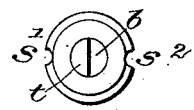
Witnesses:
Chas. H. Kimball
W. L. Goodwin
Inventor:
Otis Hood
William A. Clark
per Jos. H. Clark

UNITED STATES PATENT OFFICE.

OTIS HOOD, OF TURNER CENTRE, AND WILLIAM A. CLARK, OF WOODFORD'S, MAINE.

HORSESHOE.

SPECIFICATION forming part of Letters Patent No. 246,677, dated September 6, 1881.

Application filed February 6, 1879.

*To all whom it may concern:*

Be it known that we, OTIS HOOD, of Turner Centre, in the county of Androscoggin and State of Maine, and WILLIAM A. CLARK, of Woodford's, in Deering, in the county of Cumberland and State of Maine, have invented a new and useful Improvement in a Horseshoe with a Detachable Calk, which improvement is fully set forth in the following specification and accompanying drawings, in which—

Figure 1 is a perspective view of a horseshoe with detachable calks. Fig. 2 is a transverse section of the same, and Fig. 3 is an end view of a calk.

The object of our invention is to furnish a horseshoe with detachable calks, said horseshoe being fitted with a socket for each calk, and a countersink in the center of said socket, around a hole made in the said horseshoe, to receive a screw-bolt projecting from the base of the said calk, which calk is fitted to the socket with its countersink, so as to make said calk stand very firm in the horseshoe and be very durable, and the calk being made round, without any sharp edges, is not liable to "strike"—that is, the left feet of the horse will not hit the right feet, and the right will not "interfere" with the left feet.

In Fig. 1, $a$ is the shoe, and $d'$ $d^2$ $d^3$ are calks. The countersink $c$ and the socket $l$ show the position of the calk $d^4$.

Fig. 2 represents the fitting of the screw-projection $b$.

Fig. 3 presents the slot $t$ and the notches $s'$ $s^2$ of the calk $d$. The said calk $d$ is made in a conical form, with a shoulder to fit the countersink $c$ and the socket $l$, which fitting alone makes our invention valuable.

In the application of our invention the shoe $a$ has holes punched or drilled in it for the calks $d'$ $d^2$ $d^3$ $d^4$, and is then fitted to the foot of the horse. Said holes are then tapped to receive the screw-projections on the calks, and the countersinks $c$ and the sockets $l$ are made, after which the calks $d'$ $d^2$ $d^3$ $d^4$ are screwed into the said shoe $a$, and brought to a close joint with a punch or wrench working in the notches $s'$ $s^2$. The said shoe $a$ is then set on the foot of the horse in the usual way.

The calk $d$ is curved on the sides from near the base to near the point, so that when it wears by use it will not get dull so soon; but when it is dull it can be removed and a sharp calk put in its place without taking the shoe from the foot of the horse, and the dull calk can be used for smooth work.

If the calk $d$ should break off, the screw-bolt $b$ can be removed by the slot $t$ when the shoe $a$ is taken from the foot of the horse.

Having thus described our invention, what we claim as new, and desire to secure by Letters Patent, is—

The conical calk provided with the screw-shank $b$, the notches $s$ $s$, and the slot $t$, jointly with the shoe $a$, provided with the socket $l$ and countersink $c$, substantially as described and shown.

OTIS HOOD.
WILLIAM A. CLARK.

Witnesses:
E. E. CLARK,
C. A. CLARK.